(12) United States Patent
Vilardi et al.

(10) Patent No.: US 10,582,700 B2
(45) Date of Patent: Mar. 10, 2020

(54) LEASH WITH SELF AIMING LIGHT

(71) Applicant: WalkWhiz, LLC, Arlington, VA (US)

(72) Inventors: John Vilardi, Leesburg, FL (US);
Nathan Chefetz, Arlington, VA (US);
Cade Goldenberg, Arlington, VA (US)

(73) Assignee: WalkWhiz, LLC, Arlington, VA (US)

( * ) Notice: Subject to any disclaimer, the term of this patent is extended or adjusted under 35 U.S.C. 154(b) by 0 days.

(21) Appl. No.: 16/158,615

(22) Filed: Oct. 12, 2018

(65) Prior Publication Data

US 2019/0110439 A1   Apr. 18, 2019

Related U.S. Application Data

(60) Provisional application No. 62/572,510, filed on Oct. 15, 2017.

(51) Int. Cl.
*A01K 27/00*   (2006.01)

(52) U.S. Cl.
CPC .......... *A01K 27/006* (2013.01); *A01K 27/004* (2013.01)

(58) Field of Classification Search
CPC .. A01K 27/006; A01K 27/004; A01K 27/003; A01K 87/007; G01B 3/10; G01B 3/1084
See application file for complete search history.

(56) References Cited

U.S. PATENT DOCUMENTS

| | | | | |
|---|---|---|---|---|
| 2,833,249 | A | * | 5/1958 | Cornman ............. A01K 27/003 119/799 |
| 3,935,443 | A | * | 1/1976 | Simmons ............. A01K 27/006 362/108 |
| 4,165,713 | A | | 8/1979 | Brawner et al. |
| 5,566,493 | A | * | 10/1996 | Minorics ............. A01K 87/007 43/17.5 |
| 5,740,764 | A | | 4/1998 | Jacobsen |
| 5,762,029 | A | * | 6/1998 | DuBois ................ A01K 27/004 119/796 |
| 5,803,017 | A | * | 9/1998 | Stewart ................ A01K 27/003 119/799 |
| 5,901,668 | A | | 5/1999 | Goodger, Sr. |
| 5,950,571 | A | | 9/1999 | Schade |
| 6,085,696 | A | | 7/2000 | Fisher |
| 6,206,537 | B1 | * | 3/2001 | Hauck .................. A01K 27/006 362/102 |
| 6,247,428 | B1 | | 6/2001 | Mireles |

(Continued)

FOREIGN PATENT DOCUMENTS

| | | | | |
|---|---|---|---|---|
| DE | 29621393 U1 | * | 2/1997 | ........... A01K 27/006 |
| JP | 2001078612 A | * | 3/2001 | ............. A01K 27/00 |

(Continued)

*Primary Examiner* — Kathleen I Alker
(74) *Attorney, Agent, or Firm* — Buchanan Ingersoll & Rooney PC (57) ABSTRACT

A leash includes at least one light emitting device that is configured to move when a lead line moves to permit the focal point of the light emitted from the light emitting device to be automatically-aimed toward a pet in response to motion of the pet. The self-aiming of the light emitting device may occur automatically so that a user holding the leash does not have to do any adjustment of the holding of the leash to cause the light emitting device to be aimed toward the pet as the pet moves during a walk.

20 Claims, 10 Drawing Sheets

(56) References Cited

U.S. PATENT DOCUMENTS

| | | | |
|---|---|---|---|
| 6,439,168 B1 | 8/2002 | Maglich et al. | |
| 6,792,893 B1 | 9/2004 | Quitero et al. | |
| 6,886,499 B2 | 5/2005 | Meissner | |
| 6,955,138 B2 * | 10/2005 | DeBien | A01K 27/005 119/718 |
| 7,188,585 B1 | 3/2007 | Carter | |
| 7,207,296 B2 | 4/2007 | DiDonato | |
| 7,234,205 B2 | 6/2007 | Blauer et al. | |
| 7,536,980 B2 | 5/2009 | Cooper | |
| 7,559,292 B2 | 7/2009 | Blandford | |
| 7,614,177 B1 * | 11/2009 | Wheeler | A01K 87/007 43/17.5 |
| 7,797,782 B2 | 9/2010 | Davis et al. | |
| 7,819,088 B2 * | 10/2010 | Stern | A01K 27/006 119/796 |
| D635,725 S * | 4/2011 | Levy | D30/153 |
| 7,980,202 B2 | 7/2011 | Bentz et al. | |
| 8,061,305 B2 | 11/2011 | Sugalski | |
| 8,201,964 B2 | 6/2012 | Mattheis | |
| 8,256,384 B2 | 9/2012 | Wheeler et al. | |
| 8,256,385 B2 | 9/2012 | Goldenberg | |
| 8,312,599 B2 * | 11/2012 | Vogl | A01K 27/006 24/132 AA |
| 8,336,505 B2 | 12/2012 | Lopusnak et al. | |
| 8,393,302 B1 | 3/2013 | Blakemore | |
| 8,448,608 B2 * | 5/2013 | Mucerino, Jr. | A01K 27/005 119/797 |
| 8,683,960 B2 | 4/2014 | O'Brien et al. | |
| 9,095,125 B2 | 8/2015 | Chefetz et al. | |
| 9,155,287 B2 | 10/2015 | Messner | |
| 9,247,717 B2 * | 2/2016 | Hurwitz | A01K 27/004 |
| D765,319 S | 8/2016 | Chefetz et al. | |
| 9,545,084 B2 | 1/2017 | Osher et al. | |
| 9,603,341 B2 | 3/2017 | Scaba | |
| 2003/0094145 A1 * | 5/2003 | Cheng | A01K 27/006 119/859 |
| 2003/0110585 A1 | 6/2003 | Rechelbacher | |
| 2006/0162674 A1 * | 7/2006 | Neiser | A01K 27/004 119/795 |
| 2007/0039561 A1 | 2/2007 | Tarlton | |
| 2007/0291473 A1 * | 12/2007 | Traynor | A01K 11/00 362/106 |
| 2009/0095225 A1 * | 4/2009 | O'Connell | A01K 27/006 119/161 |
| 2011/0067649 A1 | 3/2011 | O'Brien et al. | |
| 2011/0120388 A1 * | 5/2011 | Shahbaz | A01K 27/004 119/796 |
| 2012/0079994 A1 | 4/2012 | Chefetz | |
| 2012/0318212 A1 | 12/2012 | Montenegro | |
| 2014/0096721 A1 | 4/2014 | Millard | |
| 2014/0216361 A1 | 8/2014 | Chung | |
| 2017/0181406 A1 | 6/2017 | Onthank | |
| 2017/0367303 A1 * | 12/2017 | Bitar | A01K 27/003 |

FOREIGN PATENT DOCUMENTS

| | | | | |
|---|---|---|---|---|
| JP | 2001279587 A | * | 10/2001 | D07B 1/14 |
| JP | 2009189332 A | * | 8/2009 | A01K 27/006 |
| KR | 480354 Y1 | * | 5/2016 | A01K 27/00 |
| WO | WO-2005008122 A1 | * | 1/2005 | A01K 27/006 |
| WO | WO-2009104378 A1 | * | 8/2009 | A01K 27/006 |

* cited by examiner

FIG. 11

LEASH WITH SELF AIMING LIGHT

CROSS-REFERENCE TO RELATED APPLICATIONS

The present application claims priority to U.S. Provisional Patent Application No. 62/572,510, which was filed on Oct. 15, 2017.

TECHNICAL FIELD

The present disclosure relates to leashes for walking a pet.

BACKGROUND

Leashes are often used to walk a pet, such as a dog. Examples of leashes can be appreciated from U.S. Pat. Nos. 8,256,385 and 9,095,125.

Some leashes can utilize a retractable lead line and include a handle that is relatively large and bulky. The handle is also usually made of a rigid material such as a rigid plastic. In some cases, such leashes can be difficult to hold or manipulate for a user. This can be particularly true when the user is also holding other objects (e.g. an umbrella, a bag, etc.).

SUMMARY

We have determined that use of a leash at night time can also be difficult. Often a person walking a dog or other animal must hold a leash in one hand and a light in another hand. We have determined that this can make walking a dog or other pet difficult at night. This can be a particular problem for people that live in locations that have long nights during winter (e.g. Canada, northern U.S.A., Scandinavia, Scotland, southern part of Argentina, etc.) as many pet owners in such locations have to walk a pet at night, dusk, dawn, or some other poor visibility condition for a significant portion of a given year.

We have determined that a person can have difficulty keeping a hand free while using a bag to pick up feces the pet may deposit on a neighbor's yard during a walk while holding a leash and, also, holding a flashlight. Further, it can be difficult for the person to keep the light he or she is holding to directly illuminate the pet's walking path. As a pet may walk further away from the pet's owner, the pet may wander out of the light beam. A person during a walk can also be inattentive at times and forget to keep the light beam of a flash light illuminating the pet being walked for parts of their walk. We have determined that this can pose a danger to the pet being walked as oncoming traffic may have a tougher time seeing the pet. Further, it can pose a danger to the pet owner as the owner can be distracted by manipulation of both the leash and the light he or she is holding and not sufficiently appreciate oncoming traffic or other problematic environmental issues that may arise as the owner is walking his or her pet.

According to aspects illustrated herein, there is provided a leash for a pet that can include a handle and a lead line that is one of: (a) retractable and extendable from a housing to which the handle is attached and (b) attached to the handle. A light emitting device can be attached to the housing and/or the lead line. The light can be attached so that it moves in response to movement of the lead line that extending from the handle and/or housing. The light emitting device can emit a light that automatically moves with the lead line. The lead line may bend left or right in response to a pet walking while connected to the lead line. A user of the leash can use a hand to hold the leash and also have the light of the leash move automatically with movement of the pet connected to the lead line so that the user can keep a hand free for other uses. The light emitting device can also be attached to the leash so that it permits the light to self-aim in response to motion of the lead line. The light automatically adjusts and aims itself in response to motion of the lead line created by a pet. This automatic self-aiming action can maintain a focal point from the light emitted from the light emitting device aimed towards the pet as the pet moves. This can improve the visibility of the pet for the owner and allows oncoming traffic and other nearby personnel to see the pet while a pet is walked at night or during poor visibility conditions (e.g. dusk, dawn, rain, etc.).

Embodiments of the leash can include wiring that extends to electrically connect the light emitting device to a power source. The power source can be positioned in the leash housing or the power source can be positioned adjacent a handle of the leash (e.g. in the handle, adjacent an end of the handle etc.). The handle can be attached to the leash housing. wherein the light emitting device has a housing and a light generation mechanism, the lead line passing through a channel of the housing of the light emitting device; and Embodiments of the leash can be configured so that the second end of the flexible connector is attached to the housing of the light emitting device such that a channel of the housing of the light emitting device is aligned with a lead line passageway of the flexible connector so that a lead line is passable through the flexible connector and the light emitting device housing when the lead line is extended or retracted from the leash housing. In other embodiments, the lead line may be configured to only pass through the lead line passageway of the flexible connector. For such embodiments, the light emitting device can be connected to the flexible connector so that a motion of the flexible connector also caused the light emitting device to move (e.g. the light emitting device can be connected to a middle portion of the flexible connector that is between the ends of the flexible connector, the light emitting device is connected to an external side of the flexible connector at an intermediate section of the flexible connector, etc.).

According to other aspects illustrated herein, there is provided a method of controlling a pet animal that includes at least the steps of putting a leash on the pet and using a light attached to the leash to automatically self-aim in response to motion of the lead line that is created by the pet when the pet is walked while connected to the lead line (e.g. via a collar, etc.).

The above described and other features are exemplified by the following figures and detailed description.

BRIEF DESCRIPTION OF THE DRAWINGS

Referring now to the figures, which are exemplary embodiments, and wherein the like elements are numbered alike.

Other details, objects, and advantages of embodiments of the innovations disclosed herein will become apparent from the following description of exemplary embodiments and associated exemplary methods.

DETAILED DESCRIPTION

As may be appreciated from FIGS. 1-11, disclosed herein is a leash 1 for a pet, such as a dog, a cat, a rabbit, or other non-human animal that is kept as a pet. The leash can include a handle 3 attached to a leash housing 5. The leash housing 5 can include a body that defines at least one cavity that retains internal components such as a portion of the lead line 13 that may extend from the leash housing 5. In some embodiments the lead line 13 can extend from the leash housing 5. In other embodiments, the handle 3 can be directly attached to a lead line 13 and the lead line may not be extendable or retractable from a housing. The lead line 13 can be configured for attachment to a collar 15 that is worn by a pet 17 so that the pet 17 can be walked while on a leash. A first terminal end 13a of the lead line 13 can be attached to the collar 15 via a connector 15a, for example.

The lead line 13 can also have a second terminal end opposite the first terminal end 13a and a middle portion that is between the first and second terminal ends. The second end of the lead line 13 can be attached to handle 3 and/or to a spool, reel, or wheel that is enclosed within the leash housing 5. When a spool, reel, or wheel is attached to a second terminal end of the lead line 13, the lead line 13 can be windable and unwindable about the spool, reel or wheel within the leash housing 5 via a retraction mechanism that can be connected to the spool that can be biased to wind the lead line about the spool, reel or wheel and have the retraction force overcome by force exerted by the pet to which the lead line is connected to permit the lead line to be unwound from the spool. A brake mechanism can be utilized to lock motion of the spool so that the spool does not rotate and extension and retraction of the lead line (e.g. winding and unwinding of the lead line) are prevented.

The lead line 13 can be configured as an elongated member. For instance, the lead line 13 can be configured as an elongated strap, an elongated elastomeric member such as, for example, a bungee cord, an elongated cable, an elongated wire, a rope, or other type of flexible elongated member.

The lead line 13 can be retractable and extendible from the leash housing 5. For instance, at least one spool of a winding and unwinding mechanism can be enclosed within the leash housing 5 and the lead line 13 can be attached to the spool such that the lead line is windable and unwindable from the spool. The spool can also be considered a reel, a wheel, or other structure that can rotate in one direction to wind up the lead line 13 and rotate in an opposite direction when the lead line is unwound from the spool and extended therefrom. The spool can be biased to wind the lead line to retract the lead line within the leash housing 5 via a spring mechanism or other type of biasing mechanism. Actuation of one or more actuators 7 such as buttons or sliders can be configured to adjust the biasing mechanism or brake mechanism to effect a winding of the lead line 13 about the spool or permit force exerted by an animal to which the lead line is connected to unwind the lead line from the spool and permit the lead line to extend out of the leash housing 5. The actuators 7 can be moveably positioned in actuator openings 7c that are at least partially defined by the leash housing 5. In some embodiments, the actuators 7 can be positioned adjacent the handle 3 so that a user can manipulate one or more of the actuators via their finger(s) while holding on to the handle 3.

Manipulation of first and second buttons 7a and 7b can be used to adjust the position of a lock mechanism that can also be connected to the spool. Actuation of the lock mechanism by pressing the first button 7a can actuate locking of the spool to prevent any further unwinding of the lead line 13 when the lock mechanism is moved to its locked position via use of the first button. Actuation of the second button 7b can result in unlocking of the lock mechanism to permit the spool to move for unwinding of the lead line 13 or for further winding of the lead line 13 to retract the lead line 13. In one embodiment, a brake mechanism such as a brake and/or a brake lock can be connected to the spool of the winding and unwinding mechanism to provide a force that may exert a locking force on the spool and/or a biasing force on the spool to prevent rotation of the spool to prevent further extension of the lead line out of the leash housing 5.

In some embodiments, the handle 3 can be directly attached to the leash housing 5. In other embodiments, the handle 3 can be directly attached to the lead line 13 and the lead line 13 may not be retractable or extendible from a leash housing. For example, in some embodiments, the lead line 13 of the leash can be directly connected to a handle 3 instead of being extendable and retractable from a housing that is attached to the handle 3. For instance, the lead line 13 can be affixed to the handle 3 by a fastener, a coupling, an adhesive, or other fastening mechanism.

The handle 3 can be configured as a pliable handle to permit a user to more easily hold onto the leash and reduce finger and hand fatigue when the user walks a pet to which the leash is connected. An example of the pliable handle that can be utilized in the leash 1 is disclosed in U.S. Pat. No. 9,095,125. The entirety of U.S. Pat. No. 9,095,125 is incorporated by reference herein.

The lead line 13 can have a first terminal end 13*a* attached to a connector 15*a*. The connector 15*a* can be configured to attach to a collar or harness that can be sized and configured for being worn by a pet. For instance, the collar 15 can be configured to be positioned around the neck of a dog, cat, or rabbit to be worn by the pet and the connector 15*a* may be connected to that collar. As another example, a harness may be worn by a pet and have a ring or other connector element to which the connector 15*a* is releasably attachable. In some embodiments, the connector 15*a* can be a clip, a clasp, or other type of connection mechanism that can be releasably connected to a ring or other element of a collar or harness to connect the first terminal end 13*a* of the lead line 13 to the collar 15 or harness.

The leash 1 can also include at least one light emitting device 11 that is connected to the leash housing 5 and/or handle 3 via a flexible connector 9 (e.g. for embodiments of a leash 1 in which the lead line 13 is not retractable and extendable from a housing 5, the flexible connector 9 can be directly attached to the handle 3 such that the lead line 13 passes through the flexible connector 9 and/or a portion of a housing of the light emitting device 11 that can be attached to the flexible connector 9). In some embodiments, a portion of the lead line can pass through the flexible connector 9 that can be positioned between the light emitting device 11 and the outer surface of the leash housing 5. A portion of the lead line 13 can also pass through a portion of the light emitting device 11, such as being passed through the housing 11*b* of the light emitting device 11. For instance, the housing 11*b* of the light emitting device 11 can include a channel or other type of aperture through which a portion of the lead line 13 passes. The housing 11*b* of the light emitting device 11 can be connected to the lead line 13 via this channel 11*c* of the light emitting device housing 11*b*, which can be configured to so that the lead line 13 can be extended and retracted through the channel 11*c*.

The flexible connector 9 can be an annular structure having a middle passageway or central passageway 9*a* through which the middle portion of the lead line 13 is passable so that the lead line 13 is extendable out of the leash housing 5 of the leash and is also retractable back within the leash housing 5 of the leash 1. For instance, the leash housing 5 can have a lead line opening 5*a* through which the middle portion of the lead line is passable as the lead line 13 extends from or retracts back into the leash housing 5 via the leash housing's lead line opening 5*a*. The flexible connector 9 can also include an outer covering that at least partially defines an external surface of the flexible connector so that the outer covering flexibly and/or resiliently encloses a coil spring, tubular elastomeric member, flexible connector body having a central channel, or other type of flexible member of the flexible connector 9. The first end 9*b* of the flexible connector 9 can be attached to the leash housing 5 adjacent the lead line opening 5*a* of the leash housing 5 and the second end 9*c* of the flexible connector 9 that is opposite its first end 9*b* can be connected to the housing 11*b* of the light emitting device 11. The lead line opening 5*a* of the leash housing 5 can be aligned with the lead line passageway 9*a* of the flexible connector 9 so that the lead line passes out of the leash housing 5 and through the flexible connector 9 prior to passing through the housing 11*b* of the light emitting device 11. After passing out of the light emitting device housing 11*b*, the lead line 13 can extend to the collar 15 or harness of a pet 17 for attachment to the pet via the collar or harness.

The elongated body of the flexible connector 9 can be configured to bend sideways a in response to motion of the lead line 13. The motion of the lead line 13 that drives such flexible sideward motion can be caused via the motion of the pet 17 coupled to the lead line 13, motion of the leash housing 5 that is held by a user, or combinations of both such actions. The sideways motion can include bending or flexing upwardly and to the right, to the right, to the left, downwardly and to the left, and in various other directions (e.g. from linearly extending from adjacent the lead line opening 5*a* of the leash housing to moving into a different orientation by bending to the right, left, upwardly, or downwardly direction in response to motion of a pet 17 to which the lead line 13 is connected).

Figure 1:
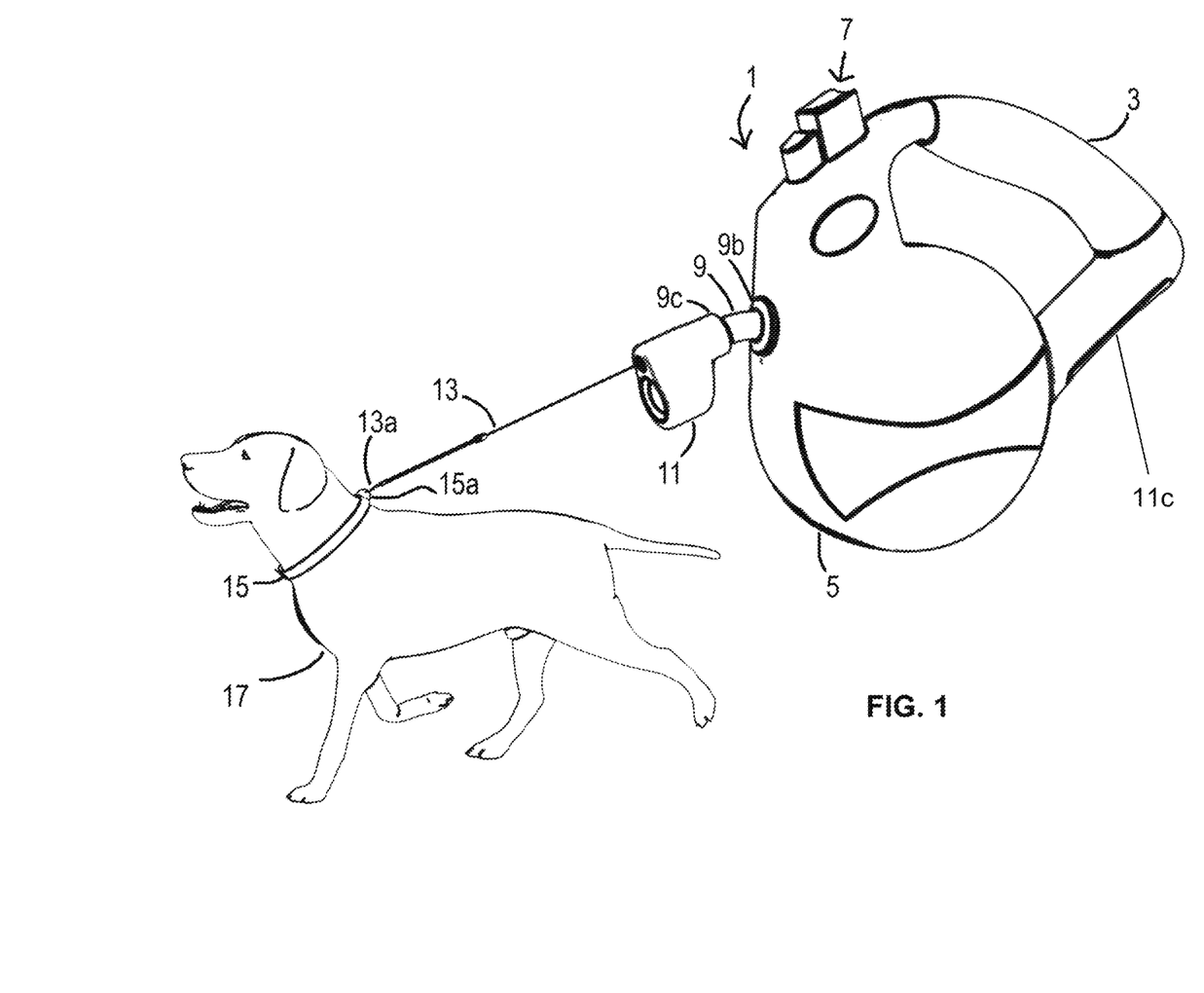
FIG. 1 is a perspective side view of a first exemplary embodiment of a leash connected to a pet animal.
Figure 2:
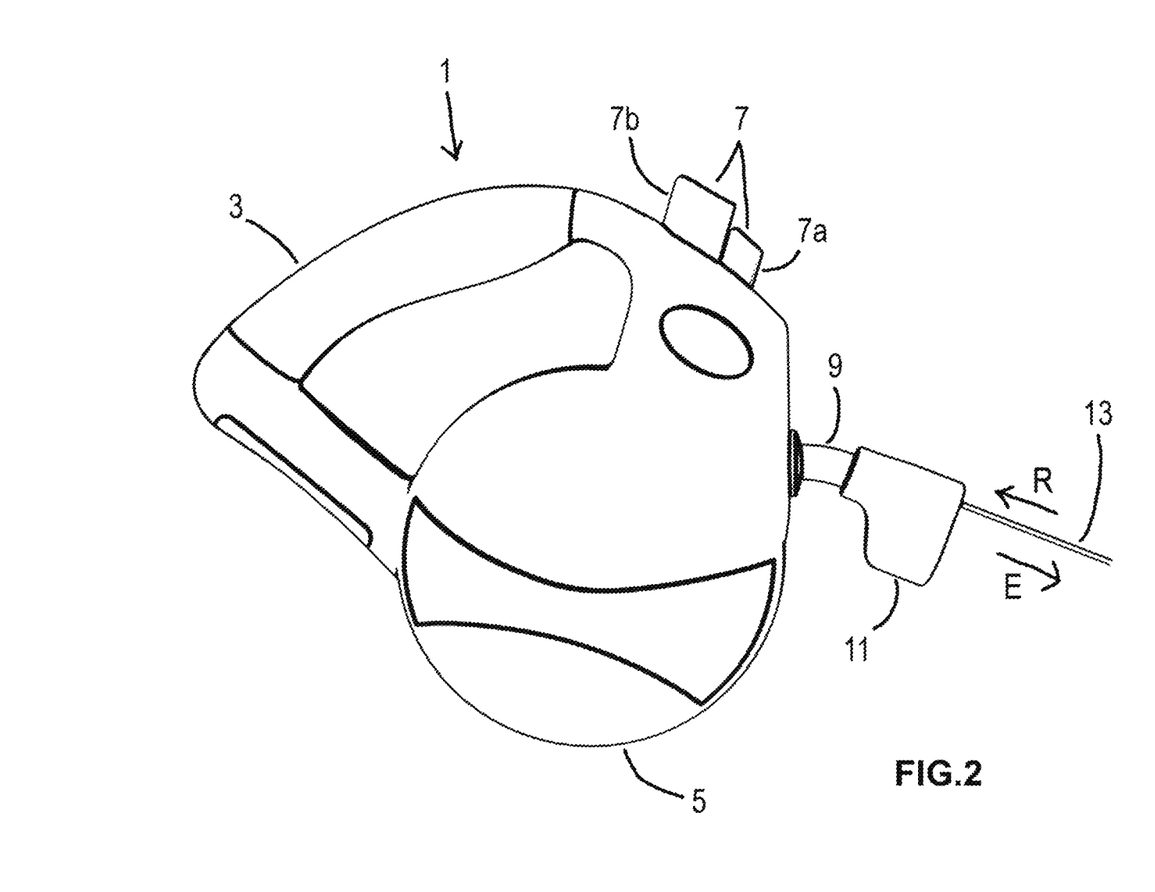
FIG. 2 is a side view of the first exemplary embodiment of the leash.
Figure 3:
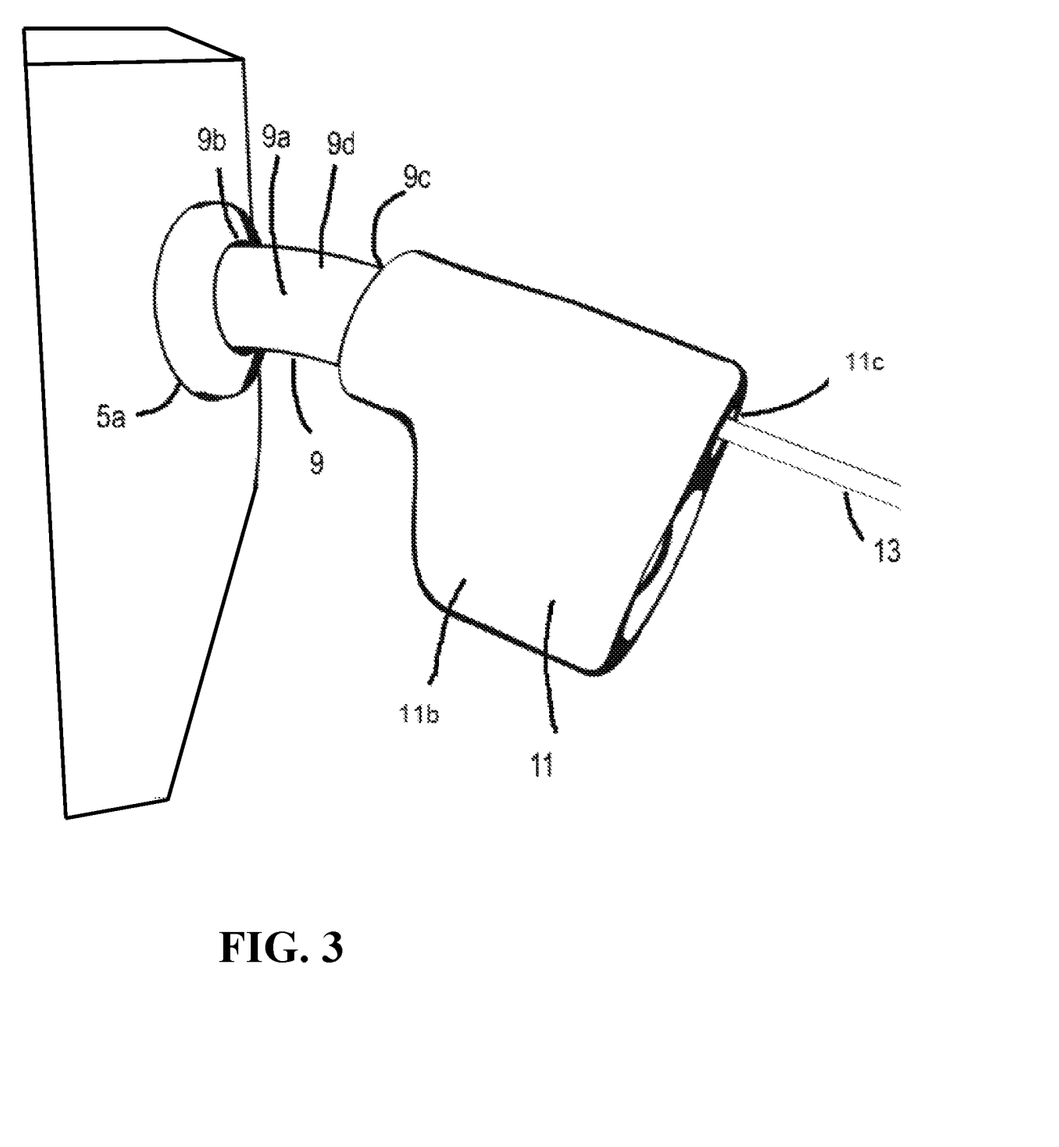
FIG. 3 is an enlarged fragmentary perspective front view of the first exemplary embodiment of the leash.
Figure 4:
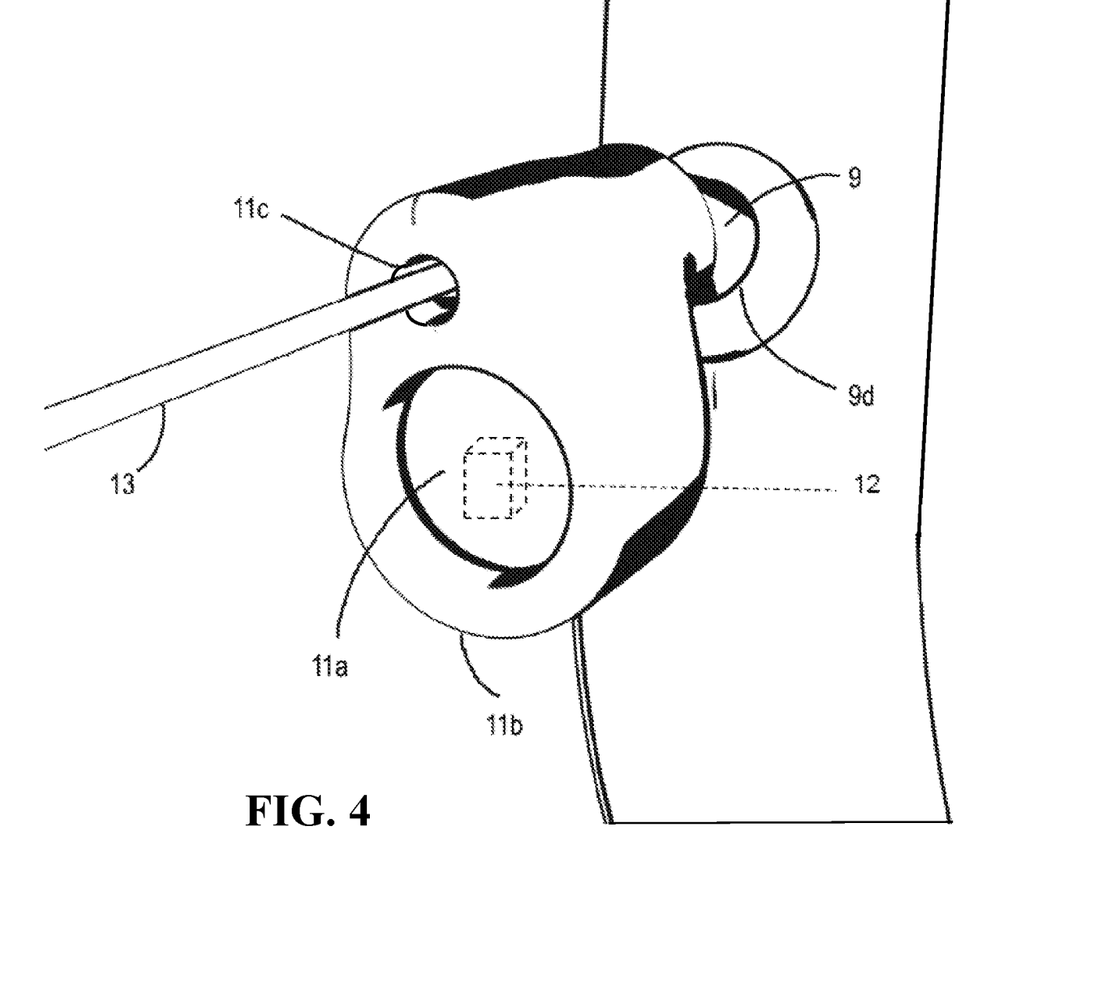
FIG. 4 is a front perspective fragmentary view of the first exemplary embodiment of the leash.
Figure 5:
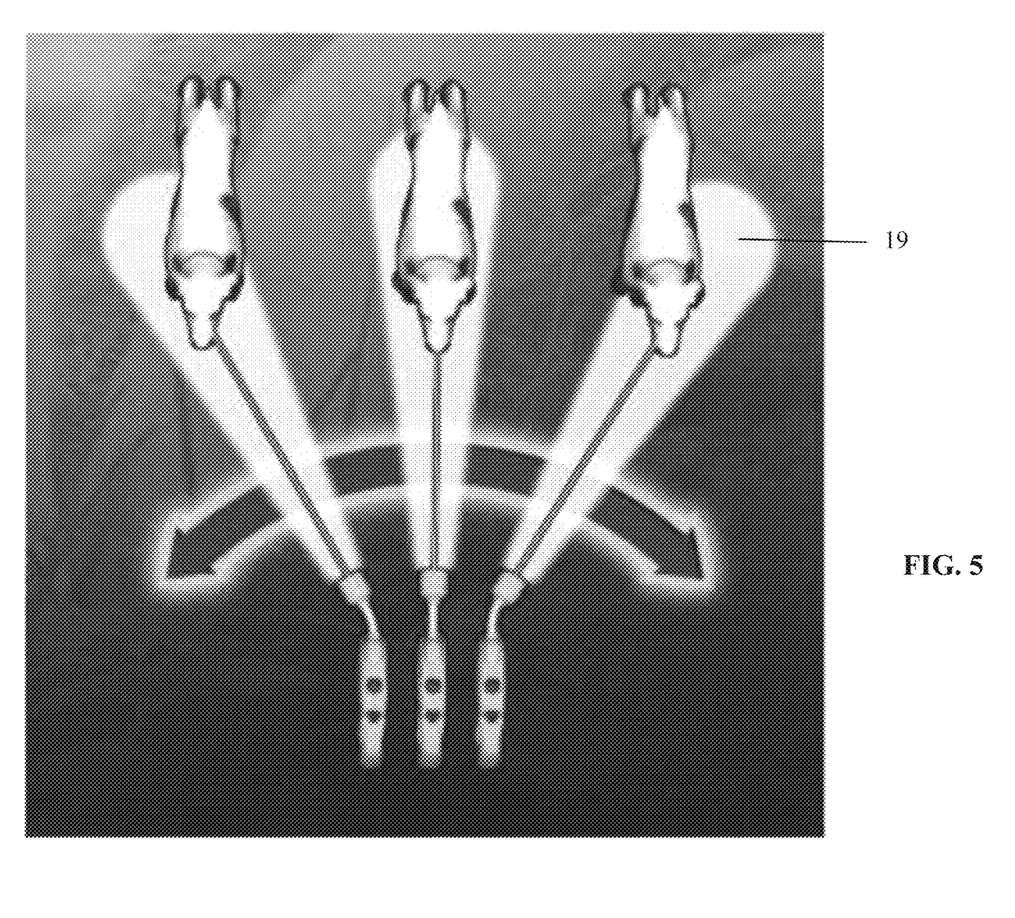
FIG. 5 is a schematic view illustrating an automatic self-aiming light emission feature of the first exemplary embodiment of the leash.
Figure 6:
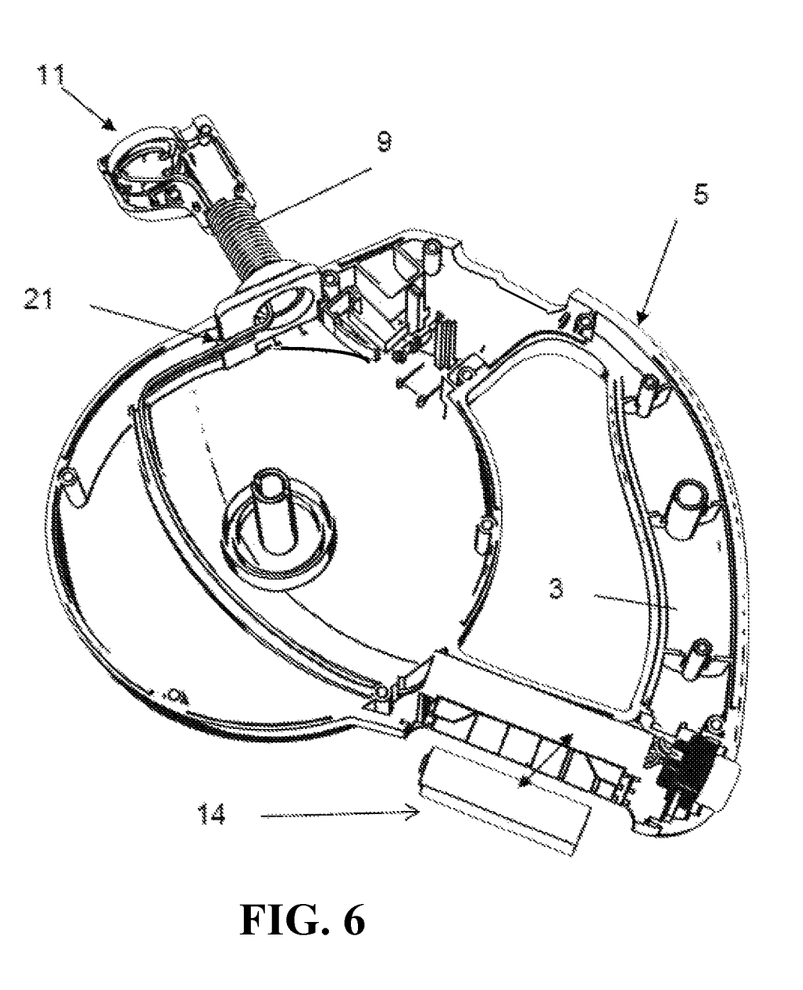
FIG. 6 is a view the first exemplary embodiment of the leash with a portion of the outer housing, actuators 7, the lead line and the lead line reel cut away for illustrating an exemplary electrical wiring included in the leash for connecting the light emitting device to an electrical power source (e.g. at least one battery).
Figure 7:
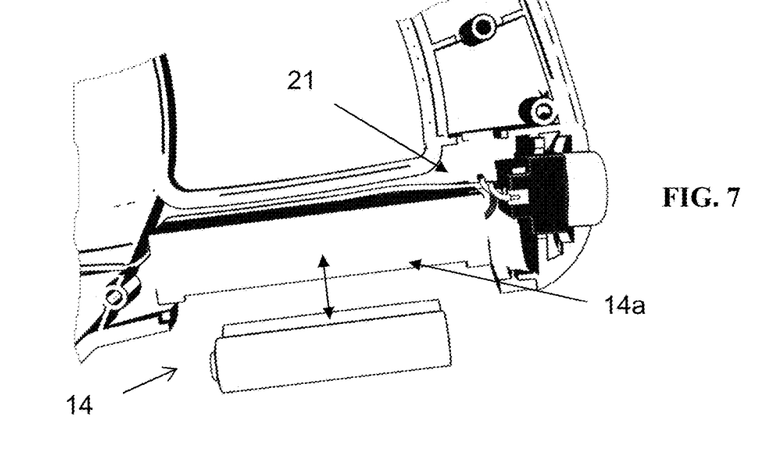
FIG. 7 is an enlarged fragmentary view the first exemplary embodiment of the leash shown in FIG. 6 that may better illustrate the exemplary electrical wiring included in the leash for connecting the light emitting device to an electrical power source (e.g. at least one battery).
Figure 8:
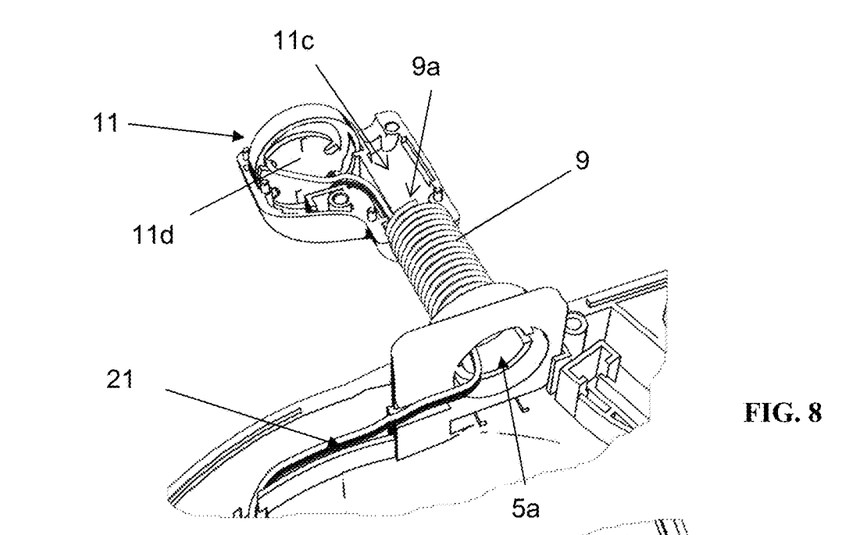
FIG. 8 is an enlarged fragmentary view the first exemplary embodiment of the leash shown in FIG. 6 that may better illustrate the exemplary retention mechanism for an electrical power source (e.g. at least one battery).

This sideward motion of the flexible connector can cause the flexible connector 9 to move from a linearly extending orientation to a bent orientation or a curved orientation, as may be appreciated from the exemplary orientations shown in FIG. 5. In the linearly extending orientation, an entirety of a length of a body of the flexible connector extends linearly from the first end of the flexible connector to the second end of the flexible connector when the flexible connector is in the linearly extending orientation. In the curved orientation or bent orientation, the intermediate portion of the body of the flexible connector 9 can be curved and the second end 9*c* of the flexible connector 9 is positioned to the right, to the left, upwardly, and/or downwardly relative to the first end 9*b* of the flexible connector 9.

It should be appreciated that sideward motion can include motion to a right side, motion to a left side, upward motion, downward motion, and can also include right or left motion that occurs at the same time upward or downward motion is occurring. The flexible motion of the flexible connector 9 can be along at least two different axes at the same time—an axis for vertical motion (upward and downward motion) and an axis for lateral motion (leftward and rightward motion). The flexible motion can include rotational motion via bending of the flexible connector that may occur from lateral motion, vertical motion, and/or a combination of lateral and vertical motion.

In some embodiments, the body of the flexible connector 9 can be configured to be resilient so that it is biased back to a linearly extending position when a pet induced force is not applied via the lead line 13. In other embodiments, the flexible connector may be configured to flex and bend and then stay in that flexed or bent position after the pet induced force is removed until another external force (e.g. further motion of a pet or manipulation by a hand of a user, etc.) causes the flexible connector 9 to bend or flex into another position. For example, in some embodiments, the flexible connector 9 can be configured as a coil spring, a flexible metal hose, a flexible hose, a flexible tubing, a flexible metal conduit, a flexible polymeric conduit, an elongated resilient body that defines a central or middle lead line passageway 9*a* (e.g. tubular in shape, etc.) that is bendable or flexible from a linearly extending orientation into different orientations, or an elongated flexible body that defines a central or middle lead line passageway 9*a* (e.g. tubular in shape, etc.) that can flex or bend from a linearly extending orientation into different orientations (e.g. C-shaped orientation, V-shaped orientation, U-shaped orientation, L-shaped orientation, etc.).

Lateral, or side-to-side, motion of the lead line 13 can result in the lead line 13 contacting the inner portion of the flexible connector 9 that defines the lead line passageway 9a of the flexible connector 9. This contacting can cause the flexible connector 9 to move in response to a bending motion of the lead line 13 that may be driven, or otherwise caused, by a pet to which the lead line 13 is connected. FIG. 5 illustrates exemplary lateral bending that may be caused by the contacting of the outer surface of the lead line to the inner surface of the flexible connector 9 that defines the lead line passageway 9a through which the lead line 13 is passable.

The light emitting device 11 can be connected to the lead line 13 and leash housing 5 so that a bending motion of the lead line 13 causes the lens 11a through which light is emitted to move along with the lead line 13 while the lead line 13 is also able to extend out of the leash housing 5 of the leash and the housing 11b of the light emitting device and is also able to be retracted back within the leash housing 5 via motion through the channel 11c of the housing 11b of the light emitting device 11 and passageway 9a of the flexible connector 9. An example of such side-to-side motion is shown in FIG. 5 that accounts for side-to-side motion of a lead line 13 that may be caused by a pet 17 to which the lead line 13 is connected and how the focal area 19 of the light can be automatically self-aimed in response to such side-to-side motion of the pet 17 via the light emitting device 11 connection to the lead line 13 and leash housing 5 via flexible connector 9 and the lead line 13 passing through that flexible connector 9 such that bending of the lead line portion that extends through the flexible connector 9 results in bending of the flexible connector 9.

In some embodiments, the lead line 13 can extend from a central portion of the light emitting device 11. In other embodiments, such as embodiments shown in FIGS. 1-11, the lead line 13 can extend below the light emitting device 11 or above the light emitting device 11. For instance, the light emitting device 11 can be attached to an external side 9d of the flexible connector between the first end 9b and second end 9c of the flexible connector 9 so that the lead line never passes through the light emitting device, but does pass through the flexible connector 9. For such embodiments, the light emitting device 11 could be affixed to the flexible connector 9 at a mid-portion of the flexible connector (e.g. at a side, above or below the passageway 9a of the flexible connector 9) so that motion of the flexible connector 9 also results in the light emitting device 11 moving with the flexible connector 9.

As yet another example, the lead line 13 can pass through the light emitting device housing 11b at a position that is below, above, or to a side (e.g. a left side or right side) of the lens 11a of the light emitting device through which light is emitted to the focal point 19 of the light. An example of such a configuration is shown in FIGS. 1-11. The second end 9c of the flexible connector 9 can be attached to the light emitting device housing 11b so that the channel 11c of the light emitting device housing 11b through which the lead line 13 passes is in communication with the lead line passageway 9a of the flexible connector 9 to facilitate the motion of the lead line 13 into the leash housing 5 in a retracting direction of motion R and out of these elements as the lead line 13 is extended out of the leash housing 5 in an extension direction of motion E. The flexible attachment of the light emitting device 11 to the leash housing 5 via the flexible connector 9 can facilitate the positioning of the light emitting device 11 and also permit the dynamic and automatic self-aiming motion of the light emitting device 11 that can be driven by motion of the lead line 13 while also permitting the lead line 13 to still be retractable and extendable from the leash housing 5.

The light emitting device 11 can include a lens 11a that is attached to a housing 11b. The light emitting device housing 11b can define a cavity 11d in which a light generation mechanism 12 is positioned. The light generation mechanism 12 can be configured to generate a light and direct the generated light out of the lens 11a so that the light emitting device 11 generates light having a focal point 19. The light generation mechanism 12 can include at least one light emitting diode or at least one light bulb.

The light generation mechanism 12 can be connected to a power source that is positioned in the cavity 11d and is in electrical connection with the light generation mechanism 12. The power source 14 can be one or more batteries 14 retained within a power source retention receptacle 14a positioned in the housing 5 or handle 3. The power source can be a solar powered battery charged or powered by solar energy (e.g. a solar power source that includes at least one solar cell that converts light directly into electricity using the photoelectric effect). Examples of possible batteries that could be used as the power source include a lithium battery, an alkaline battery, and a solar powered battery. The power source could alternatively be a power providing mechanism that is powered by the kinetic motion of the leash housing 5 or other external force (e.g. use of a flywheel energy storage system, use of a dynamo, use of a hand driven dynamo, etc.).

Electrical energy created via the power source can be transmitted to the light generation mechanism 12 to power the light generation mechanism 12 via wiring 21 for generation of the light to be directed out of the lens 11a to form the focal point 19 of light. The wiring 21 can be routed so that the wiring 21 extends from the power source 14 to the light generation mechanism 12 from within the housing 5. A portion of the wiring 21 can extend out of the opening 5a of the housing, through passageway 9a of the flexible connector 9, and into the light emitting device housing 11b. A first terminal end of the wiring can be connected to the power source and the second terminal end of the wiring can be connected to the light generation mechanism 12 to electrically conduct electricity from the power source to the light generation mechanism 12 for use by the light generation mechanism to generate a light to be emitted via the lens 11a. The wiring can extend through the passageway 9a of the flexible connector adjacent to where a lead line 13 may pass through that passageway 9a. In some embodiments, the wiring 21 can be routed within a separate tube or conduit that is defined in the passageway 9a or adjacent the passageway 9a through which the lead line 13 passes so that the lead line does not come into direct contact with the wiring 21 (e.g. there is some type of cover or protective barrier separating the wiring 21 from the lead line 13 in the passageway 9a and/or in the flexible connector 9.

The light emitting device 11 can include an on/off switch or other type of actuator that can be connected to the light generation mechanism 12 to actuate the light emitting device being turned on to generate light and being switched off so that no light is generated. The on/off switch can be directly positioned on the leash handle 3, housing 5, or the housing of the light emitting device 11. The on/off switch can be operatively connected to the wiring 21 and/or power source (e.g. battery 14) to actuate the transmission of electricity to the light generation mechanism 12 for forming the light having the focal point 19.

The leash housing 5 can include an access component 11e that is moveably connected to and/or removably connected to the housing 5 so that the power source retention receptacle 14a can be accessed by a user to remove an old battery and replace it with a new battery (e.g. a replacement battery) so that the replacement battery can be connected to the light emitting device 11 via wiring 21 that extends from the leash housing to the light emitting device 11. In some embodiments, the access component 11e can always be attached to the leash housing 5 and be moveable between open and closed positions for accessing power source 14. For example, the access component 11e can be configured as an access door that is moveable from an open position to a closed position. In other embodiments, the access component 11e can be removable from the leash housing 5 to provide user access to the power source 14 via the power source retention receptacle 14a. In some embodiments, the access component 11e can be sized and configured as a hatch, an access panel, or an access compartment panel that defines part of leash housing 5 when attached and defines an opening for access to the power source retention receptacle 14a when moved to an open position to provide access to the power source retention receptacle 14a (e.g. by removal of the component or by adjustable movement of the component from a locked and closed position to an unlocked and open position, etc.). One or more fasteners (e.g. screws or bolts) can be used to help form the connection between a body of the leash housing 5 and the access component 11e.

In other embodiments, the access component 11e, power source receptacle 14a and power source can be positioned in the light emitting device housing 11b. For such embodiments, the access component 11e can be configured to mate and interlock for a connection to define a part of the external surface of the light emitting device housing 11b that helps define a portion of the cavity 11d. One or more fasteners (e.g. screws or bolts) can be used to help form the connection between a body of the light emitting device housing 11b and the access component 11e.

A method of controlling a pet animal is also provided. The method can include the step of putting a leash on the pet by having the lead line 13 connected to the collar or harness of a pet 17. The leash can be an embodiment of the leash discussed herein. For example, the leash can include a handle and a lead line that is one of: (a) retractable and extendable from a housing to which the handle is attached and (b) attached directly to the handle. The handle of the leash can then be grasped by a user and used to direct or control movement of the pet. When walking the pet, the pet may move about causing the lead line to extend at different angles relative to the leash housing 5 of the leash 1 (e.g. from straight in front of the lead line opening 5a of the leash housing 5 to a position that is to the left or to the right of the lead line opening 5a as shown in FIG. 5, etc.). For instance, the lead line 13 may bend to extend from a central location toward a right-side position or to a left-side position during the walking of a pet as shown, for example, in FIG. 5. The light emitting device may automatically move in response to such sideward motion of the lead line 13 that is caused by the pet so that the light emitting device 11 automatically self-aims toward the pet 17 in response to the motion of the pet affecting the angle at which the lead line 13 extends from the leash housing 5. A user may not have to do anything to cause the automatic motion of the light emitting device 11 so that a focal point 19 of the light emitted by the light emitting device 11 is automatically aimed at the pet and moves along with the pet as the pet moves during a walk while the user holds the handle 3 attached to the leash housing 5 as the user walks with his or her pet. This automatic self-aiming of the focal point of the light can permit a user to keep one of the user's hands free to hold onto another object (e.g. a bag, an umbrella, etc.) and/or use that free hand while walking the pet (e.g. use the free hand to pick up feces that may be deposited on a neighbor's yard during the walking of the pet, etc.). The automatic self-aiming of the focal point of the light can also permit the safety of the pet being walked to be increased by illuminating the presence and/or location of the pet for oncoming traffic.

It should be appreciated that various changes can be made to embodiments of the leash and leash handle. For example, the size, shape or configuration of the handle can be any of a number of suitable shapes. For instance, in some embodiments the handle 3 may be structured to have an annular shape, a ring-like shape, a generally U-shape, a generally C-shape, or other shape and have its inner core over-molded onto or otherwise adhered to or joined with the lead line 13. As another example, the leash lead line 13 can be any type of lead line suitable for controlling or otherwise directing motion of a pet. The pet can be any type of non-human animal such as a dog, cat, rabbit, or other pet animal. As yet another example, the leash housing 5 may be configured to retract and extend multiple lead lines about one spool within the housing 5 or within multiple spools enclosed within the leash housing 5. For such embodiments, multiple lead lines may flexibly pass through an element of a single light emitting device such that the movement of the lead lines causes the single light emitting device to move in a self-aiming fashion. In other embodiments, multiple lead lines may each pass through its own respective light emitting device (e.g. if there are two lead lines, there can be a first light for the first lead line and a second light for the second lead line, if there are three lead lines, there can be a first light for the first lead line, a second light for the second lead line and a third light for the third lead line, etc.).

Figure 9:
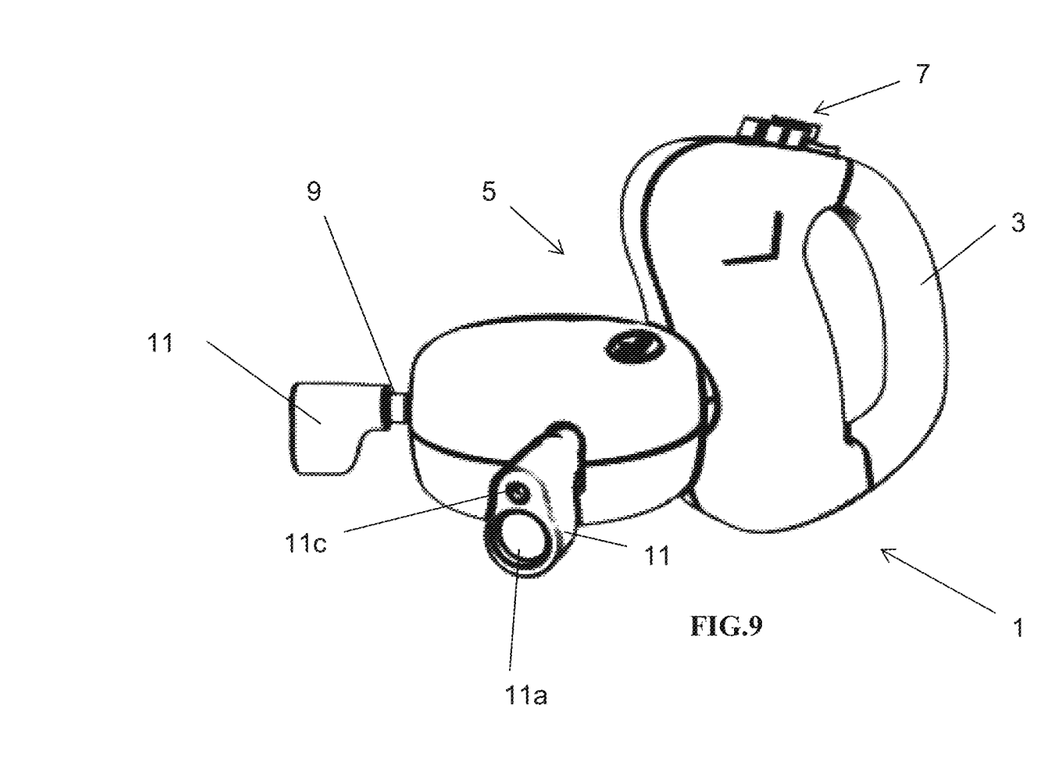
FIG. 9 is a perspective view of a second exemplary embodiment of the leash.
Figure 10:
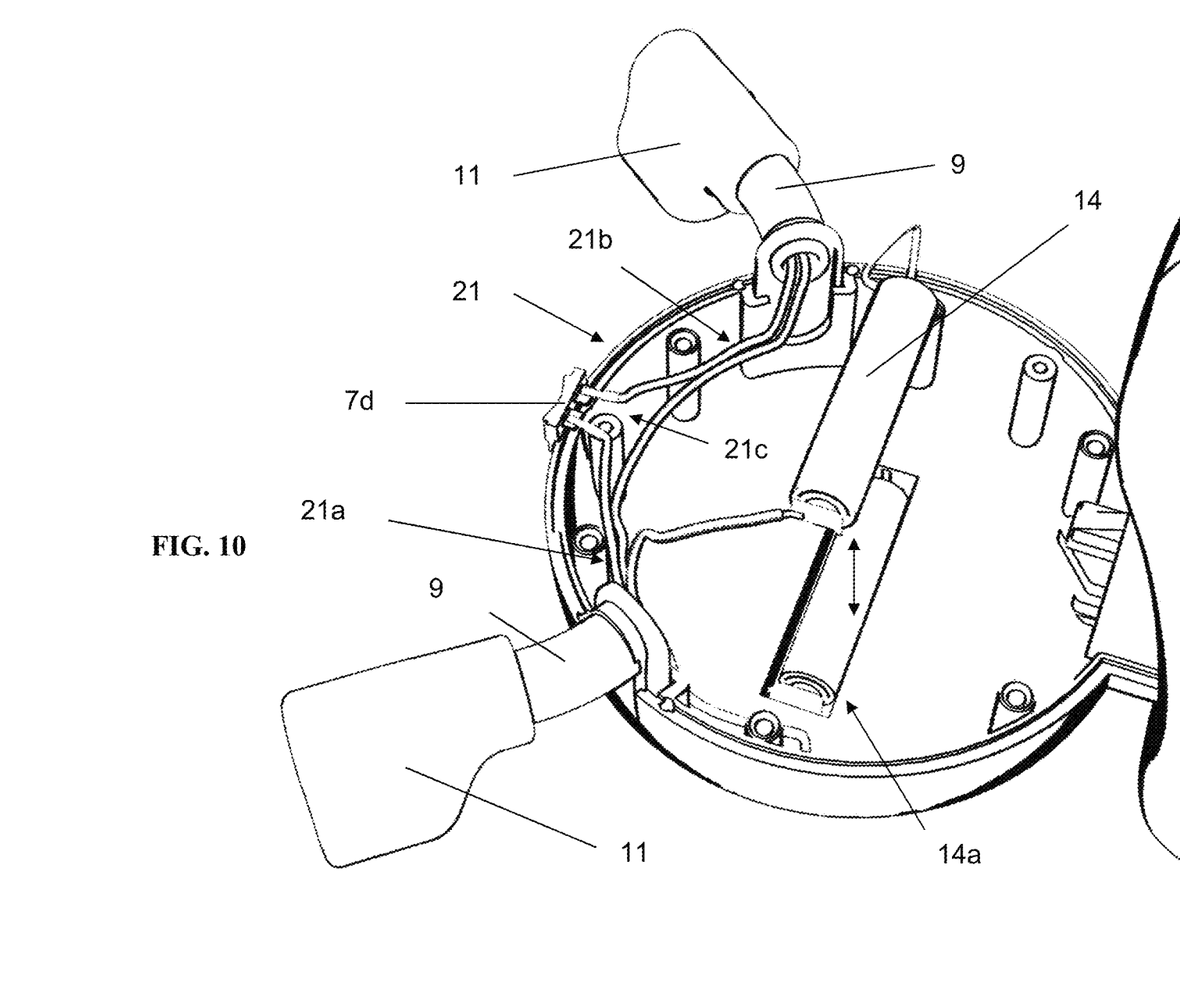
FIG. 10 is a fragmentary view of the second exemplary embodiment of the leash with a portion of the housing, the lead lines, the lead line spools, and actuators 7 cut away to illustrate exemplary wiring and an exemplary retained power source positioned therein.
Figure 11:
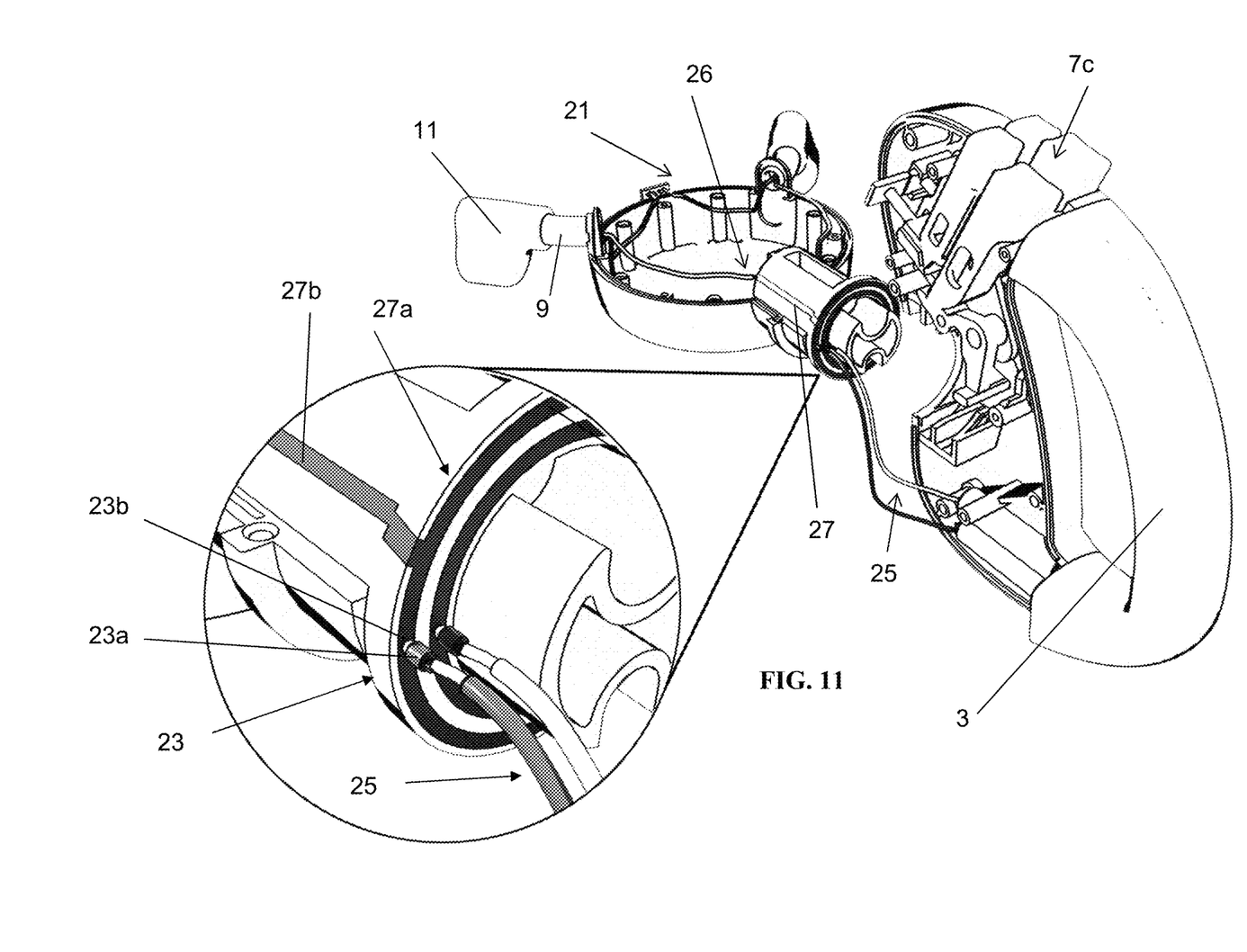
FIG. 11 is a perspective view of a third embodiment of the leash with a portion of the housing positioned in a decoupled position adjacent another portion of the leash to illustrate an exemplary electrical connection between a power source positioned in or adjacent a handle of the leash to light emitting devices of the leash. The actuators 7, lead lines 13 and lead line reels are cut away in FIG. 11 to better illustrate electrically conductive connection related features of this embodiment.

Exemplary embodiments of the leash 1 that utilize multiple lead lines 13 and multiple flexible connectors 9 are shown in FIGS. 9-11. Such embodiments can have multiple lead lines 13 in which each lead line is separately and independently positioned on a respective lead line spool enclosed within leash housing 5 for independent retraction and extension of that lead line (e.g. a first lead line is moveably attached to a first reel and a second lead line is moveably attached to a second reel within the leash housing 5). Such embodiments can include a power source positioned in the leash housing 5 and include a first wiring segment 21a of the wiring 21 that extends from a positive terminal of the power source and a second wiring segment 21b of the wiring 21 that extends from a negative terminal of the power source. The wiring 21 can also include wiring segments 21c that are connected to a moveable on/off switch 7d moveably attached to the leash housing 5. The on/off switch can be configured to turn the light emitting devices 11 on or off via motion of the switch between on and off positions.

Other embodiments can include wiring for a first wring segment 25 that extends from a power source to an intermediate connector 27. The intermediate connector 27 can connect the first wiring segment 25 to a second wiring segment 26 that extends from the intermediate connector 27 to the light emitting devices 11. The intermediate connector 27 can include at least one metallic strip, metallic tape or other type of metallic body that may extend from within the leash housing from a position adjacent the handle to a position adjacent a cavity of the leash housing that can retain lead line spools. The second segment of the wiring 26 can be separate from the first segment 25 but still electrically connected to the first segment 25 of the wiring via the intermediate connector 27. The terminal ends of each wiring segment connected to the intermediate connector 27 can include a moveable connection mechanism 23 that helps ensure the connection to the intermediate connector 27 even if the intermediate connector 27 may move relative to the first and/or second wiring segments. Each moveable connection mechanism 23 can include a spring 23a that is biased to fully extend from the wiring segment to which it is attached to the intermediate connector. The wiring 21 can also be connected to an on/off switch that is moveably attached for movement between on and off positions. The on/off switch can be positioned on the leash housing 5 or the handle 3.

Each spring 23a of each moveable connection mechanism 23 can be resiliently moved away from the intermediate connector 27 due to motion of that intermediate connector 27 within the leash housing 5. Each spring 23a can be configured to be biased to resiliently move between a fully extended position to a compressed position that is shorter than its fully extended position. Each spring 23a can be configured to be resiliently biased to return to its uncompressed, fully extended configuration when the intermediate connector 27 is moved away from the wiring segment to which the spring 23a is connected. Each spring 23a can be configured to resiliently compress in response to the intermediate connector 27 moving toward the wiring to which that spring 23a is connected as well. A terminal end of each spring 23a can be connected to a contacting element 23b. The contacting element 23b can be configured as a ball bearing or other type of contacting element for contacting an interface portion 27a of the intermediate connector 27 to conduct electricity from the power source to which a wiring segment is connected to the intermediate connector 27 for being transmitted to the other wiring segment for delivery to a light emitting device 11.

Each intermediate connector 27 can include at least one electrically conductive interface portion 27a that is positioned for connection to a moveable connector 23 of a wiring segment. A middle portion 27b of the intermediate connector 27 can include at least one electrically conductive segment that extends between interface portions 27a that are on opposite ends (or opposite sides) of the intermediate connector 27. For instance, the middle portion 27b can include one electrically conductive tape, two electrically conductive tapes, or more than two electrically conductive tapes that extend between the interface portions 27a. Examples of such electrically conductive tapes can include copper tape or copper filaments that may extend from a first interface portion 27a to a second interface portion 27a that is opposite the first interface portion 27a.

It should be appreciated that the middle portion 27b can provide an electrically conductive connection between the interface portions 27a of the intermediate connector 27 that are on opposite sides of the intermediate connector 27 so that the separated wiring segments can be connected to each other for transmitting electricity to different light emitting devices 11. Each interface portion 27a can have a different shape or configuration (e.g. ring-like shape, annular shape, polygonal shape, etc.). The middle portion 27b can include at least one elongated segment of electrically conductive material (e.g. a metallic tape, a copper filament, etc.) that extends between the interface portions 27a. Each interface portion 27a can be configured for connection to a respective moveable connection mechanism 23.

Each wiring segment of the wiring 21 can include multiple different wires or electrically conductive elongated elements (e.g. copper wiring). The wiring 21 can include cables or other elongated electrically conductive members that are configured to connect a positive terminal and a negative terminal of a power source to at least one light emitting device 11. (e.g. at least one first member connected to a negative terminal of a power source and at least one second member connected to a positive terminal for a power source). The wiring 21 can also include at least one ground member.

As yet other examples of changes that can be made to embodiments of the leash, the shape and size of the leash housing 5 can have any of a number of different configurations. For example, the leash housing 5 may have a top section, a side section or a bottom section that is configured to slidably attach to actuators 7 for controlling the windability of one or more lead lines that are extendable and retractable out of at least one aperture of the leash housing 5. The actuators 7 can be moveably positioned in actuator openings 7c that are at least partially defined by the leash housing 5. As another example, the lead line enclosing portion of the leash housing 5 can be configured to enclose an entirety of at least one spool and winding mechanism for retractably and extendably retaining at least one lead line 13. As yet another example, the size and shape of the light emitting device 11, the lens 11a of the light emitting device, the size and configuration of the light generation mechanism 12, and the type, size and configuration of the power source can be any of a number of different sizes and configurations that may meet a particular set of design criteria. For example, embodiments can use fiberoptic materials and a remote light and power source, or e use a fixed light source on the body/handle of the leash that the user may direct independent of the movement of the pet. Such light emitting mechanisms can be used in combination or as alternative to light emitting device 11 connected to flexible connector 9.

As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A leash comprising:
   a lead line;
   a leash housing having a lead line opening, the lead line being extendable via the lead line opening of the leash housing;
   a flexible connector having a lead line passageway, the flexible connector having a first end and a second end, the first end of the flexible connector attached to the leash housing such that the lead line passageway is aligned with the lead line opening so that the lead line is passable through the lead line passageway, the lead line passageway being defined by the flexible connector such that the lead line is moveable relative to the flexible connector and is moveable independent of the flexible connector when the lead line passes through the lead line passageway during extension of the lead line out of the lead line opening;

a light emitting device attached to the flexible connector such that flexing motion of the flexible connector causes the light emitting device to also move; and wherein the flexible connector is configured to be biased to a linearly extending orientation.

2. The leash of claim 1, wherein the flexible connector is configured so that sideward motion of the lead line drives sideward bending motion of the flexible connector so that a focal point of light emitted by the light emitting device is automatically moved via the sideward bending motion of the flexible connector to automatically self-aim the focal point.

3. The leash of claim 1, wherein the flexible connector is configured so that sideward motion of the lead line drives sideward bending motion of the flexible connector so that the flexible connector is adjusted from the linearly extending orientation into a bent orientation or a curved orientation and a focal point of light emitted by the light emitting device is automatically moved via sideward bending motion of the flexible connector that occurs as the flexible connector moves from the linearly extending orientation to the bent orientation or the curved orientation to automatically self-aim the focal point onto a pet connected to the lead line.

4. The leash of claim 3, wherein an entirety of a length of a body of the flexible connector extends linearly from the first end of the flexible connector to the second end of the flexible connector when the flexible connector is in the linearly extending orientation.

5. The leash of claim 4, wherein an intermediate portion of the body of the flexible connector is curved when the flexible connector is in the curved orientation or the bent orientation, the intermediate portion of the body of the flexible connector being between the first end of the flexible connector and the second end of the flexible connector.

6. The leash of claim 1, wherein the flexible connector is moveable between the linearly extending orientation and at least one curved orientation.

7. The leash of claim 6, wherein:
an entirety of a length of a body of the flexible connector extends linearly from the first end of the flexible connector to the second end of the flexible connector when the flexible connector is in the linearly extending orientation; and
an intermediate portion of the body of the flexible connector is curved when the flexible connector is in the at least one curved orientation, the intermediate portion of the body of the flexible connector being between the first end of the flexible connector and the second end of the flexible connector.

8. A leash comprising:
a lead line;
a leash housing having a lead line opening, the lead line being extendable via the lead line opening of the leash housing;
a flexible connector having a lead line passageway, the flexible connector having a first end and a second end, the first end of the flexible connector attached to the leash housing such that the lead line passageway is aligned with the lead line opening so that the lead line is passable through the lead line passageway, the lead line passageway being defined by the flexible connector such that the lead line is moveable relative to the flexible connector and is moveable independent of the flexible connector when the lead line passes through the lead line passageway during extension of the lead line out of the lead line opening; and
a light emitting device attached to the flexible connector such that flexing motion of the flexible connector causes the light emitting device to also move;

wherein the flexible connector is configured so that sideward motion of the lead line drives sideward bending motion of the flexible connector so that a focal point of light emitted by the light emitting device is automatically moved via the sideward bending motion of the flexible connector to automatically self-aim the focal point; and wherein the light emitting device has a housing and a light generation mechanism, the lead line passing through a channel of the housing of the light emitting device.

9. The leash of claim 8, wherein the second end of the flexible connector is directly attached to the housing of the light emitting device such that the channel of the housing of the light emitting device is aligned with the lead line passageway.

10. The leash of claim 8, wherein the channel is positioned below or above the light generation mechanism.

11. The leash of claim 8, wherein the lead line has a first end and a second end, the first end being connectable to a collar or a harness.

12. The leash of claim 8, wherein the flexible connector is configured to be biased to a linearly extending orientation.

13. A leash comprising:
a lead line;
a leash housing having a lead line opening, the lead line being extendable via the lead line opening of the leash housing;
a flexible connector having a lead line passageway, the flexible connector having a first end and a second end, the first end of the flexible connector attached to the leash housing such that the lead line passageway is aligned with the lead line opening so that the lead line is passable through the lead line passageway, the lead line passageway being defined by the flexible connector such that the lead line is moveable relative to the flexible connector and is moveable independent of the flexible connector when the lead line passes through the lead line passageway during extension of the lead line out of the lead line opening; and
a light emitting device attached to the flexible connector such that flexing motion of the flexible connector causes the light emitting device to also move;
wherein the light emitting device has a housing and a light generation mechanism, the lead line passing through a channel of the housing of the light emitting device; and
wherein the second end of the flexible connector is attached to the housing of the light emitting device such that the channel of the housing of the light emitting device is aligned with the lead line passageway.

14. The leash of claim 13, wherein the leash housing encloses a portion of the lead line.

15. The leash of claim 13, comprising a power source and wiring that electrically connects the light emitting device to the power source, the power source positioned in the leash housing or the power source positioned adjacent a handle of the leash, the handle being attached to the leash housing.

16. A method of controlling a pet animal comprising:
connecting a leash to the pet, the leash comprising:
a lead line;
a leash housing having a lead line opening, the lead line being extendable via the lead line opening of the leash housing;
a flexible connector having a lead line passageway, the flexible connector having a first end and a second end, the first end of the flexible connector attached to the leash housing such that the lead line passageway is aligned with the lead line opening so that the lead line is passable through the lead line passageway, the lead line passageway being defined by the flexible connector such that the lead line is moveable relative to the flexible connector and is moveable independent of the flexible connector when the lead line passes through the lead line passageway during extension of the lead line out of the lead line opening; and a light emitting device attached to the flexible connector such that flexing motion of the flexible connector causes the light emitting device to also move; and in response to motion of the pet, moving the flexible connector from a linearly extending orientation to a curved orientation to cause the light emitting device to be automatically moved to adjust a focal point of light being emitted from the light emitting device so that the focal point of the light is automatically adjusted to be aimed toward the pet via the motion of the pet connected to the leash.

17. The method of claim 16, wherein:

an entirety of a length of a body of the flexible connector extends linearly from the first end of the flexible connector to the second end of the flexible connector when the flexible connector is in the linearly extending orientation; and an intermediate portion of the body of the flexible connector is curved when the flexible connector is in the curved orientation, the intermediate portion of the body of the flexible connector being between the first end of the flexible connector and the second end of the flexible connector.

18. The method of claim 16, comprising:

replacing a battery of the light emitting device with a replacement battery for connecting the replacement battery to the light emitting device via wiring that extends from the leash housing to the light emitting device.

19. The method of claim 16, comprising:

walking the pet after the pet is connected to the leash; and the lead line moving through the lead line passageway relative to the flexible connector as the lead line passes through the lead line passageway during extension of the lead line in response to the motion of the pet; and wherein sideward motion of the lead line that occurs due to the motion of the pet drives the moving of the flexible connector from the linearly extending orientation to the curved orientation to cause the light emitting device to be automatically moved to adjust a focal point of light being emitted from the light emitting device so that the focal point of the light is automatically adjusted to be aimed toward the pet via the motion of the pet connected to the leash.

20. The method of claim 19, comprising:

holding the leash in a first hand and, while holding the leash in the first hand, using a second hand to collect feces the pet deposited on ground during the walking of the pet.

* * * * *